(12) United States Patent
Sayre et al.

(10) Patent No.: US 9,919,492 B2
(45) Date of Patent: Mar. 20, 2018

(54) ARMOR SYSTEM WITH MULTI-HIT CAPACITY AND METHOD OF MANUFACTURE

(71) Applicant: Battelle Memorial Institute, Columbus, OH (US)

(72) Inventors: Jay R. Sayre, New Albany, OH (US); Kary L. Valentine, Mars, PA (US); Clarence E. Pollock, Galloway, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 14/776,118

(22) PCT Filed: Mar. 17, 2014

(86) PCT No.: PCT/US2014/030486
§ 371 (c)(1),
(2) Date: Sep. 14, 2015

(87) PCT Pub. No.: WO2014/145681
PCT Pub. Date: Sep. 18, 2014

(65) Prior Publication Data
US 2016/0025460 A1    Jan. 28, 2016

Related U.S. Application Data

(60) Provisional application No. 61/793,034, filed on Mar. 15, 2013.

(51) Int. Cl.
*F41H 5/04* (2006.01)
*B32B 9/00* (2006.01)
*B32B 5/12* (2006.01)
*B32B 5/26* (2006.01)
*B32B 9/04* (2006.01)
*B32B 27/12* (2006.01)
*B32B 27/40* (2006.01)

(52) U.S. Cl.
CPC ............. *B32B 9/005* (2013.01); *B32B 5/12* (2013.01); *B32B 5/26* (2013.01); *B32B 9/045* (2013.01); *B32B 27/12* (2013.01); *B32B 27/40* (2013.01); *F41H 5/0428* (2013.01); *B32B 2262/0253* (2013.01); *B32B 2307/536* (2013.01); *B32B 2307/558* (2013.01); *B32B 2571/02* (2013.01)

(58) Field of Classification Search
CPC .......................... F41H 5/0492; F41H 5/0428
USPC ............................................. 89/36.02, 36.08
See application file for complete search history.

(56) References Cited

U.S. PATENT DOCUMENTS 4,307,140 A * 12/1981 Davis .................. B29C 37/0082
156/276
4,911,061 A * 3/1990 Pivitt .................... F41H 5/0435
109/84

(Continued)

*Primary Examiner* — Joshua E Freeman
(74) *Attorney, Agent, or Firm* — Diederiks & Whitelaw, PLC

(57) ABSTRACT

An armor panel is formed of a central layer of ballistic tiles, a support plate and a layer of high strength fiber weave. An outer layer of fiber weave formed of two plies of high strength fiber is wrapped around central layer, support plate and layer of high strength fiber weave. An inner layer of fiber weave formed of two plies of high strength fiber is wrapped around central layer. Armor panel is formed by molding.

4 Claims, 15 Drawing Sheets

(56) References Cited

U.S. PATENT DOCUMENTS

| | | | | |
|---|---|---|---|---|
| 5,705,764 A * | 1/1998 | Schade | F41H 5/0428 | 428/911 |
| 5,705,765 A * | 1/1998 | Singh | F41H 5/0414 | 428/911 |
| 6,253,655 B1 * | 7/2001 | Lyons | F41H 5/0428 | 89/36.02 |
| 6,497,966 B2 * | 12/2002 | Cohen | F41H 5/0421 | 139/420 R |
| 6,532,857 B1 * | 3/2003 | Shih | F41H 5/0421 | 89/36.02 |
| 7,827,899 B2 | 11/2010 | Ravid et al. | | |
| 7,861,638 B1 * | 1/2011 | Percival | B32B 17/04 | 428/49 |
| 8,087,339 B2 | 1/2012 | Mann et al. | | |
| 8,096,223 B1 * | 1/2012 | Andrews | F41H 5/0492 | 89/36.02 |
| 8,267,001 B2 * | 9/2012 | Sayre | F41H 5/0421 | 89/36.02 |
| 8,616,113 B2 | 12/2013 | Gallo et al. | | |
| 9,140,524 B2 * | 9/2015 | Fingerhut | F41H 5/0435 | |
| 2003/0139108 A1 | 7/2003 | Klintworth et al. | | |
| 2009/0133571 A1 * | 5/2009 | Pfister | F41H 7/04 | 89/36.07 |
| 2010/0043630 A1 * | 2/2010 | Sayre | F41H 5/0421 | 89/36.02 |
| 2011/0023695 A1 * | 2/2011 | van Heerden | B64D 7/00 | 89/36.02 |
| 2011/0314998 A1 * | 12/2011 | Engelbart | F41H 5/0435 | 89/36.02 |
| 2012/0167751 A1 * | 7/2012 | Ardiff | F41H 5/0485 | 89/36.02 |
| 2012/0174759 A1 * | 7/2012 | Gallo | F41A 17/06 | 89/36.02 |
| 2012/0234163 A1 * | 9/2012 | Hunn | F41H 5/0492 | 89/36.02 |
| 2012/0291621 A1 * | 11/2012 | Sayre | F41H 5/0428 | 89/36.02 |
| 2012/0297964 A1 * | 11/2012 | Carberry | F41H 5/0407 | 89/36.02 |
| 2012/0318130 A1 * | 12/2012 | Genihovich | F41H 5/0492 | 89/36.02 |
| 2013/0263727 A1 * | 10/2013 | O'Masta | F41H 5/023 | 89/36.02 |
| 2013/0319214 A1 * | 12/2013 | Kopan | F41H 5/0478 | 89/36.02 |
| 2014/0069268 A1 * | 3/2014 | Ryan | C08G 18/48 | 89/36.02 |
| 2015/0260483 A1 * | 9/2015 | Wibby | F41H 5/0478 | 89/36.08 |

* cited by examiner

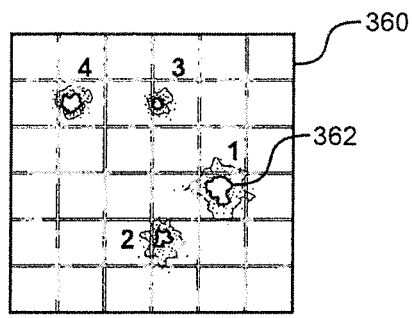
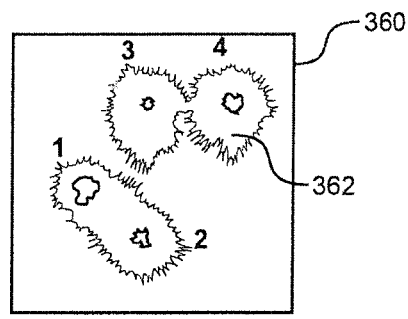
FIG. 5A  FIG. 5B
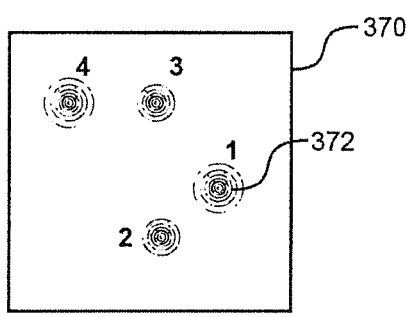
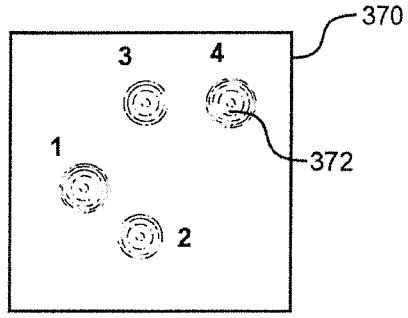
FIG. 6A  FIG. 6B
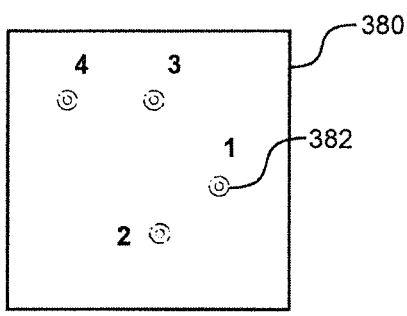
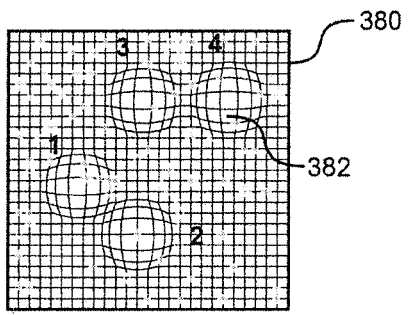
FIG. 7A  FIG. 7B

| Part Number | Panel Number | Estimated Areal Density lbs/sqft | Shot location (x,y) | PP/CP | Velocity (fps) | Ceramic Type and Size | Klk wrap Leno Ply sqft | Ceramic Thickness mm | Ceramic Weight lbs/sqft | Support Material Type |
|---|---|---|---|---|---|---|---|---|---|---|
| PRO315-46 | 21A | 13.25 | See LRB 52332-59 | PP | 2999 | Al2O3 - Plasan pellets | 4 | 14 | 10.10 | 65 Shore D |
|  |  |  |  | PP | 2980 |  |  |  |  |  |
|  |  |  |  | PP | 2975 |  |  |  |  |  |
|  |  |  |  | CP | ERR1 |  |  |  |  |  |
| PRO315-46 | 21B | 13.25 | see LRB 52303-91 | PP | 2992 | Al2O3 - Plasan pellets | 4 | 14 | 10.10 | 65 Shore D |
|  |  |  |  | PP | 2988 |  |  |  |  |  |
|  |  |  |  | PP | 2994 |  |  |  |  |  |
|  |  |  |  | CP | 2948 |  |  |  |  |  |
| PRO315-46 | 21C | 13.25 | See LRB 52332-59 | PP | 2958 | Al2O3 - Plasan pellets | 4 | 14 | 10.10 | 65 Shore D |
|  |  |  |  | PP | 3013 |  |  |  |  |  |
|  |  |  |  | CP | 2977 |  |  |  |  |  |
| PRO315-47 | 22A | 13.00 | (180,150)mm | PP | 2935 | Al2O3 - Plasan pellets | 4 | 16 | 10.90 | Fiber only |
|  |  |  | (90,165)mm | PP | 2969 |  |  |  |  |  |
|  |  |  | (150,215)mm | PP | 2990 |  |  |  |  |  |
|  |  |  | (260,215)mm | CP | 2654 |  |  |  |  |  |
| PRO315-47 | 22B | 13.00 | see LRB 52303-91 | PP | 3006 | Al2O3 - Plasan pellets | 4 | 16 | 10.90 | Fiber only |
|  |  |  |  | PP | 3013 |  |  |  |  |  |
|  |  |  |  | CP | 3024 |  |  |  |  |  |
| PRO315-47 | 22C | 13.00 | (5,2) | PP | ERR1 | Al2O3 - Plasan pellets | 4 | 16 | 10.90 | Fiber only |
| PRO315-48 | 23 | 12.39 | (4,2) | CP | 2985 | SiC - 2" SG | 4 | 18 | 11.68 | Fiber only |
|  |  |  | (3,3) | PP | 2953 |  |  |  |  |  |
| PRO315-49 # | 24 | 12.59 | (2,3) | PP | 2982 | SiC - 3" SG | 4 | 13 | 8.43 | 80 Shore D |
|  |  |  | (3,2) | PP | 2961 |  |  |  |  |  |
|  |  |  | (2,2) | PP | 2959 |  |  |  |  |  |

\* Designs that have passed the STANAG level IV threat requirement with AEP-55 multi-hit

Figure 23A

| Part Number | Panel Number | Front Support inches | Rear Support Support inches | Support Weight lbs | Front Fiber Ply sqft | Rear Fiber Ply sqft | Over Wraps Lono Ply sqft | Total Plies All Fibers sqft | Fiber Weight lbs | Urethane Weight lbs | As Cast Weight lbs |
|---|---|---|---|---|---|---|---|---|---|---|---|
| PR0315-46 | 21A | | 0.250 | 1.44 | | 2 | 8 | 14 | 0.66 | 0.38 | 12.58 |
| PR0315-46 | 21B | | 0.250 | 1.44 | | 2 | 8 | 14 | 0.66 | 0.42 | 12.62 |
| PR0315-46 | 21C | | 0.250 | 1.44 | | 2 | 8 | 14 | 0.66 | 0.36 | 12.56 |
| PR0315-47 | 22A | | | 0.00 | 1 | 2 | 8 | 15 | 0.72 | 0.86 | 12.48 |
| PR0315-47 | 22B | | | 0.00 | 1 | 2 | 8 | 15 | 0.72 | 0.86 | 12.48 |
| PR0315-47 | 22C | | | 0.00 | 1 | 2 | 8 | 15 | 0.72 | 0.84 | 12.46 |
| PR0315-48 | 23 | | | 0.00 | 2 | 3 | 8 | 17 | 0.84 | 0.86 | 13.38 |
| PR0315-49 * | 24 | | 0.625 | 3.61 | | 1 | 8 | 13 | 0.60 | 0.96 | 13.60 |

\* Designs that have passed the STANAG level IV threat requirement with AEP-55 multi-hit

Figure 23B

| Part Number | Panel Number | Estimated Areal Density lbs/sqft | Shot location (x,y) | PP/CP | Velocity (fps) | Ceramic Type and Size | Kit wrap Leno Ply sqft | Ceramic Thickness mm | Ceramic Weight lbs/sqft | Support Material Type |
|---|---|---|---|---|---|---|---|---|---|---|
| PR0315-50 | 25 | 12.50 | (3,2) | PP | 3007 | SiC - 3" SG | 4 | 13 | 8.43 | 6061 Alum |
|  |  |  | (2,3) | PP | 2956 |  |  |  |  |  |
|  |  |  | (2,2) | PP | 2985 |  |  |  |  |  |
|  |  |  | (3,3) | CP | 2966 |  |  |  |  |  |
| PR0315-51 | 26 | 12.37 | (3,2) | PP | ERR 1 | SiC - 3" SG w/ Al face plate | 4 | 13 | 8.43 | 6061 Alum |
|  |  |  | (2,2) | PP | ERR 1 |  |  |  |  |  |
|  |  |  | (2,3) | PP | ERR 1 |  |  |  |  |  |
|  |  |  | (3,3) | CP | ERR 1 |  |  |  |  |  |
| PR0315-52 | 27 | 12.80 | (3,5) | CP | 2964 | SiC 2X by 7.5mm / 2X by 8 ply | 4 | 15 | 9.73 | Fiber only |
| PR0315-53 * | 28 | 12.74 | (3,3) | PP | 2958 | Al2O3 - 3" square bonded | 4 | 13 | 10.37 | 80 Shore D |
|  |  |  | (2,3) | PP | 2973 |  |  |  |  |  |
|  |  |  | (2,2) | PP | ERR 1 |  |  |  |  |  |
|  |  |  | (3,2) | PP | 2974 |  |  |  |  |  |
| PR0315-54 | 29 | 12.19 | (3,2) | CP | 2948 | Al2O3 - 3" square bonded | 4 | 10 | 7.78 | 80 Shore D |
| PR0315-55 | 30 | 13.06 |  |  |  | Al2O3 - 3" square bonded | 4 | 10 | 7.78 | 6061 Alum |
| PR0315-56 * | 31 | 12.65 | (3,3) | PP | 2961 | Al2O3 - 3" square bonded | 4 | 13 | 10.37 | Fiber Only |
|  |  |  | (2,2) | PP | 2958 |  |  |  |  |  |
|  |  |  | (2,3) | PP | 2956 |  |  |  |  |  |
|  |  |  | (3,2) | PP | 2964 |  |  |  |  |  |
|  |  |  | (3,3) | See note | 2835 |  |  |  |  |  |
| PR0315-57 | 32 | 12.06 | (2,2) | PP | 3007 | SiC - 3" square | 4 | 16 | 10.38 | Fiber Only |
|  |  |  | (3,3) | PP | 2956 |  |  |  |  |  |
|  |  |  | (3,2) | PP | 2980 |  |  |  |  |  |
| PR0315-58 * | 33 | 12.50 | (2,2) | PP | 2969 | SiC - 3" square | 4 | 16 | 10.38 | 65 Shore D |
|  |  |  | (3,3) | PP | 2961 |  |  |  |  |  |
|  |  |  | (2,3) | PP | 2989 |  |  |  |  |  |
| PR0315-59 | 34 | 13.43 |  |  |  | Al2O3 - 3" square bonded | 4 | 16 | 12.77 | Fiber Only |
| PR0315-60 | 35 | 15.06 |  |  |  | Al2O3 - 3" square bonded | 4 | 16 | 12.77 | 80 Shore D |
| PR0315-61 | 36 | 13.67 |  |  |  | SiC - 2" SG | 4 | 18 | 11.68 | 80 Shore D |

\* Designs that have passed the STANAG level IV threat requirement with AEP-55 multi-hit

Figure 23 C

| Part Number | Panel Number | Front Support inches | Rear Support inches | Support Weight lbs | Front Fiber Ply sqft | Rear Fiber Ply sqft | Over Wraps Lens Ply sqft | Total Plies All Fibers sqft | Fiber Weight lbs | Urethane Weight lbs | As Cast Weight lbs |
|---|---|---|---|---|---|---|---|---|---|---|---|
| PRO315-50 | 25 | | 0.250 | 3.51 | | 1 | 8 | 13 | 0.60 | 0.96 | 13.50 |
| PRO315-51 | 26 | 0.062 | 0.188 | 3.51 | | 1 | 8 | 13 | 0.60 | 0.82 | 13.36 |
| PRO315-52 | 27 | | | | 2 | 16 | 8 | 30 | 1.61 | 2.48 | 13.82 |
| PRO315-53 * | 28 | | 0.250 | 1.44 | | 2 | 8 | 14 | 0.66 | 1.28 | 13.76 |
| PRO315-54 | 29 | 0.125 | 0.375 | 2.88 | 1 | 6 | 8 | 19 | 0.96 | 1.54 | 13.16 |
| PRO315-55 | 30 | 0.062 | 0.250 | 4.38 | | 2 | 8 | 14 | 0.66 | 1.29 | 14.10 |
| PRO315-56 * | 31 | | | | 2 | 10 | 8 | 24 | 1.26 | 2.03 | 13.66 |
| PRO315-57 | 32 | | | | 1 | 2 | 8 | 15 | 0.72 | 1.92 | 13.02 |
| PRO315-58 * | 33 | | 0.250 | 1.44 | 1 | 2 | 8 | 15 | 0.72 | 0.96 | 13.50 |
| PRO315-59 | 34 | | | | 1 | 2 | 8 | 15 | 0.72 | 1.01 | 14.50 |
| PRO315-60 | 35 | | 0.250 | 1.44 | 1 | 2 | 8 | 15 | 0.72 | 1.33 | 16.26 |
| PRO315-61 | 36 | | 0.250 | 1.44 | 1 | 2 | 8 | 15 | 0.72 | 0.92 | 14.76 |

* Designs that have passed the STANAG level IV threat requirement with AEP-55 multi-hit.

Figure 23D

ARMOR SYSTEM WITH MULTI-HIT CAPACITY AND METHOD OF MANUFACTURE

CROSS REFERENCE TO RELATED APPLICATION

This application represents a National Stage application of PCT/US2014/030486 entitled "Armor System with Multi-Hit Capacity and Method of Manufacture" filed Mar. 17, 2014, pending which claims the benefit of U.S. Provisional Patent Application Ser. No. 61/793,034, filed on Mar. 15, 2013, entitled "Armor System with Multi-Hit Capacity and Method of Manufacture," the contents of which are hereby incorporated by reference.

BACKGROUND OF THE INVENTION

The present invention is concerned with armor technology and, more specifically, to armor systems having the capability to protect against multiple-hit ballistic threats.

Certainly, numerous types of armor systems have been proposed in the art to protect against ballistic impacts. Typically, these systems differ with respect to the materials employed or the configuration/orientation of the materials. Each armor system is typically designed for a particular application. For instance, body armor has certain constraints to assure that the overall system is reasonably lightweight. On the other hand, armor designed for use on vehicles tends to be more robust and heavy duty. Many types of armor systems are designed to protect against a single impact from a projectile. That is, the armor is configured to prevent piercing by an initial projectile, but the impact would result in a certain amount of acceptable damage such that the armor could not be assured of protecting against a subsequent impact, particularly a subsequent impact in a region of the armor substantially close to the initial impact zone. Therefore, there is a need in the art for an armor system that protects against impacts from multiple projectiles.

SUMMARY OF THE INVENTION

The present invention is directed to a ceramic-based armor system, having particular application as a ceramic-based armor plating employed as an add-on for an armored vehicle hull. More specifically, a composite add-on plate is employed, including an outer layer of ceramic material, such as ceramic tiles, which is placed in contact with a polymeric support plate. The support plate comprises a caged fiber backing system including an edge wrapping and fiber arrangement tailored to provide requisite elongation and strength to retard the progress of projectile debris. The ceramic outer layer, in conjunction with the support plate and backing system, provides the armor add-on with the ability to perform under multiple hit conditions.

The ceramic-based armor is preferably produced in a mold. A first ply of an outer layer of high strength fiber weave is cut to approximately two times the size of the mold and is then placed in the mold. A second ply of the outer layer of high strength fiber weave is then cut to size and is also placed in the mold and is preferably oriented at 90 degrees with respect to the first ply. The two plies constitute a first layer of high strength fiber weave. A polymer such as urethane is then added to the mold thus forming a polymer/fiber composite material. A layer of high strength fiber and a support plate including edges are then placed into the mold followed by a ballistic layer. The ballistic layer is formed of a second layer of high strength fiber weave wrapped around ceramic tiles. Next the first layer is wrapped around the layer of high strength fiber, the support plate and the ballistic layer. Finally the mold is closed and placed in an oven to cure the armor panel.

The invention has various applications. However, in a preferred embodiment, the armor system is designed to protect against ballistic threats, including 14.5 mm B32 armor-piercing incendiary (API) rounds. The armor system has multi-hit capability and is preferably placed over a hull of a vehicle. In a particularly preferable configuration, the support plate establishes not only the necessary support and rigidity for the central ceramic layer but also importantly provides for shock isolation between the ceramic tiles to enable multi-hit capability by protecting adjacent tiles. The fiber backing system formed of the layer of high strength fiber weave and the plies of high strength fiber incorporates tailored fiber that retards the progress of projectile debris after a ballistic hit penetrates through the ceramic tiles and the edge wrapping thus enhancing the multi-hit robustness of the overall armor system. In addition, although air gap establishing or filler materials, such as foam, honeycomb structure, polystyrene or the like could be used between the armor panel and the armored hull of a vehicle, the invention seeks to eliminate such air gaps or other soft or low density inclusions in the armor panel to enhance direct attachment to the hull of the vehicle, thereby simplifying integration with the vehicle.

Additional objects, features and advantages of the present invention will become more readily apparent from the following detailed description of preferred embodiments when taken in conjunction with the drawings wherein like reference numerals refer to corresponding parts in the several views.

BRIEF DESCRIPTION OF THE DRAWINGS

FIGS. 5A, 5B, 6A, 6B, 7A and 7B show successful test panels;

FIGS. 23A-23D are portions of a table showing armor designs passing STANAG level IV with AEP-55 multi-hit.

DETAILED DESCRIPTION OF PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale; and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
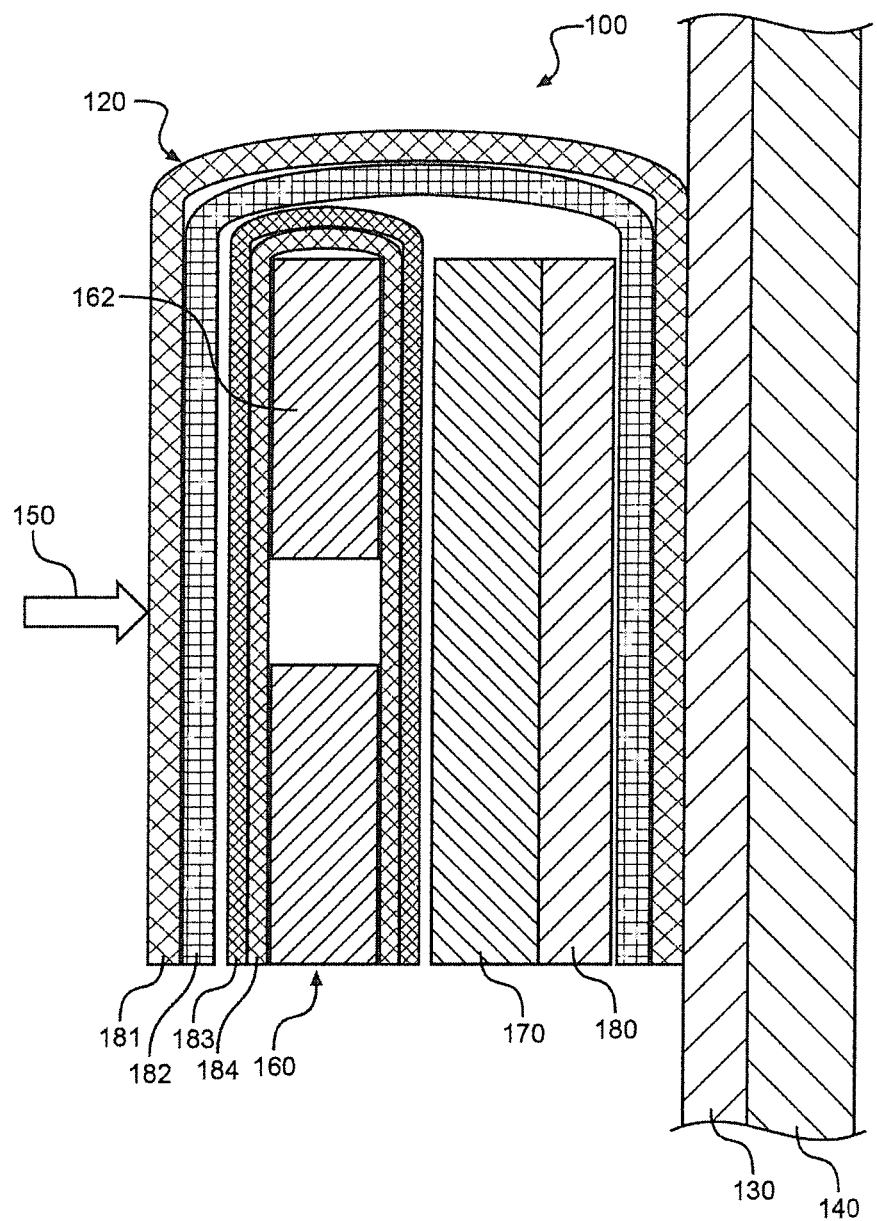
FIG. 1 is a schematic of the layers of an armor system incorporated into a vehicle showing a strike face, an armor panel, a vehicle hull and a spall liner constructed in accordance with the invention.

For purposes of this description, the armor technology of the present invention will be described with particular application to protecting against ballistic threats, such as 14.5 mm B32 API, specifically the ability of an armor system 100 to achieve multi-hit capability in an integrated armor solution including an armor panel 120 placed on a vehicle hull 130 having an inner pall layer 140. In accordance with a preferred embodiment of the invention, this armor system 100 was designed, fabricated and tested as an integrated armor solution as shown in FIG. 1. A strike face is indicated at 150. In general, armor panel 120 is formed of a central layer 160 of ballistic tiles 162, a support plate 170 and a layer of high strength fiber weave 180. An outer layer of fiber weave formed of two plies of high strength fiber 181, 182 is wrapped around central layer 160, support plate 170 and layer of high strength fiber weave 180. An inner layer of fiber weave formed of two plies of high strength fiber 183, 184 is wrapped around central layer 160.

As illustrated in FIG. 1, armor system 100 was tested as applied to an HH hull 130 of 7.3 mm which, in turn, had an associated HJ1 spall liner layer 140 of 10 mm. The component lay-up from strike face 150 back (i.e., from left to right with respect to FIG. 1) is as follows for CUE part PR0315-49:

four plies of urethane-saturated, high-strength fiber weave 181, 182, 183, 184 (two plies 183, 184 from the inner layer surrounding central layer 160 of ballistic tiles 162 and two plies 181, 182 from the outer layer);

tile kit array or central layer 160 of 13 mm (~0.51") thick silicon carbide (SiC) ballistic tiles 162;

two plies of urethane-saturated, high-strength fiber weave 183, 184 (two plies 183, 184 are from the inner layer surrounding central layer 160);

a ~15.88 mm (0.625") thick support plate 170 formed of 80 shore D aliphatic material;

one layer of a heavier, tighter, basket-weave-forming layer of high strength fiber weave 180; and two plies of urethane-saturated, high-strength fiber weave 181, 182.

Figure 2:
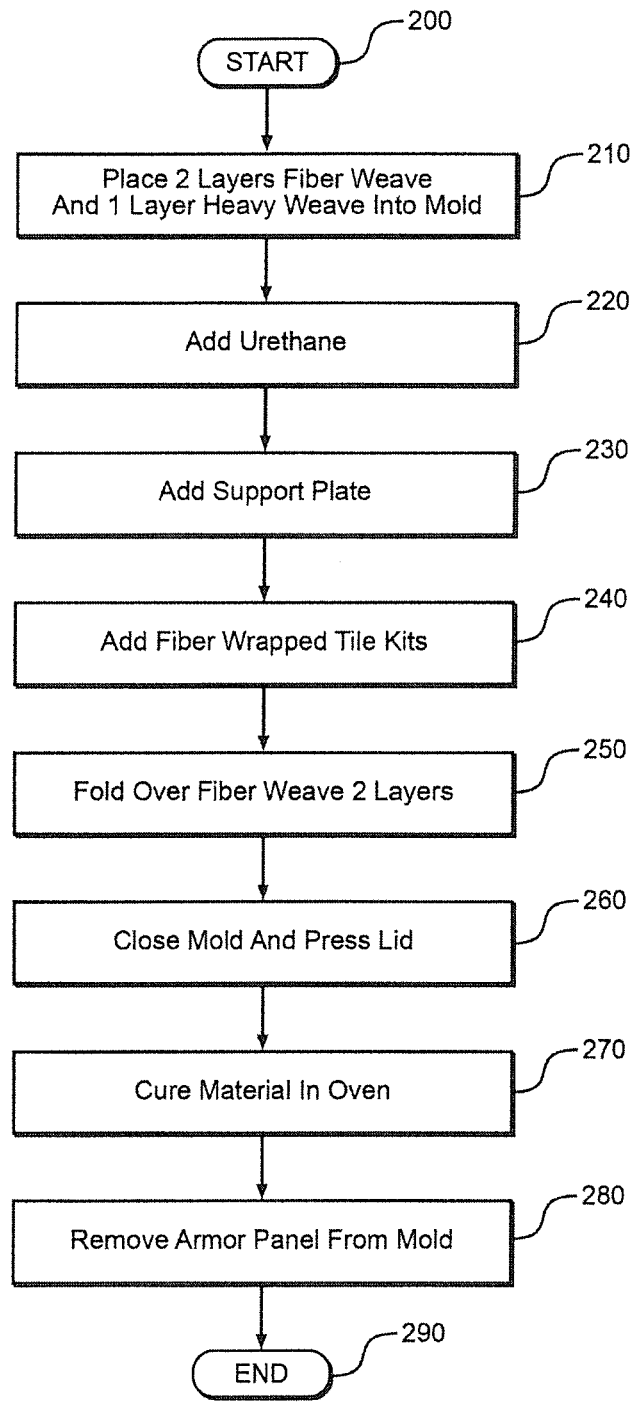
FIG. 2 is a flow chart showing a preferred method of manufacturing the armor system of FIG. 1.

By way of further detailing the invention, a method of forming each armor panel 120 will now be described with reference to FIG. 2 starting at step 200. At step 210, two rectangular plies 181, 182 of an appropriately chosen high strength fiber weave are cut to a width that is equal to the width of armor panel 120 and to a length that is equal to two times the length of armor panel 120 plus two times the thickness of armor panel 120 plus ~50.8 mm (2"). These fiber plies 181, 182 are preferably laid into an open mold transverse to each other by 90 degrees with the approximate centers of each length matched to the center of the mold. An additional heavier weave of high strength fiber weave 180 is cut (length and width) to match the dimensions of armor panel 120 and is placed on top of the transverse sheets or plies 181, 182.

At step 220, an appropriate amount of 95 shore A ether-based urethane is added to wet out the fibers and leave a slight excess that is metered into the open mold containing the transverse fiber weave sheets or plies 181, 182 and heavier sheet of high strength fiber weave 180.

At step 230, a previously molded/manufactured support plate 170 of aliphatic-based urethane is cut to the appropriate size to fit the mold (roughly 3.18 mm or ⅛" shorter length and width than the mold) and is etched or abraded on all surfaces to increase the bonding potential. Support plate 170 is then laid into the mold on top of heavier sheet of high strength fiber weave 180 and two plies of high strength fiber 181, 182 and pushed down to displace any excess 95 shore A urethane. The excess material will now be on top of aliphatic support plate 170.

At step 240, the pre-manufactured tile kit forming central layer 160, of an appropriate size and containing fiber-edge-wrapped ceramic tiles 162, is laid-up and is glued into an "envelope" of transverse-by-90-degrees, high-strength fiber plies 183, 184. Once assembled and glued, this kit or central layer 160 is rigid and can be handled as a single piece. The edge-wrapped ceramic tiles 162 provide the correct edge-to-edge tile offset and allow for the 95 shore A material to wick between individual ceramic tiles 162. This tile kit or central layer 160 is placed into the still open mold along with any additional 95 shore A urethane that may be needed and pressed down to force any remaining urethane from between aliphatic support plate 170 and the tile kit interface.

At step 250, it is determined if enough liquid urethane is present in the mold with the components. If so, the excess lengths of fiber weave from plies 181, 182 remaining outside the open mold are folded in to just ~25.4 mm (1") across the center-line of tile kit central layer 160 one at a time until all four ends have been folded over smooth. Assuming enough urethane is present, it is spread around evenly with a tool and a heavy lid is placed into the mold.

At step 260, once the lid is placed into the mold, the mold is transferred directly to a press and the lid is pressed into the mold, displacing all extra liquid urethane material thru vents leaving only enough to fill the void spaces in the fiber weave plies 181, 182, 183, 184 and tiles 162.

At step 270, once all the excess material is evacuated from the mold, the mold is securely clamped and removed from the press and placed into an oven to cure.

At step 280, after the appropriate cure time, armor panel 120 can be removed from the mold and the process ends at step 290 or may be repeated with additional materials The 95 shore A urethane tends to bond quite well to tiles 162 as well as aliphatic support plate 170. This material is thin enough to wet out the fibers and wick through and between the tile edge seams. The fiber weaves and edge wraps are saturated with this material and, once cured, the material serves as a great protective coating as well as the glue that holds everything together.

Figure 3:
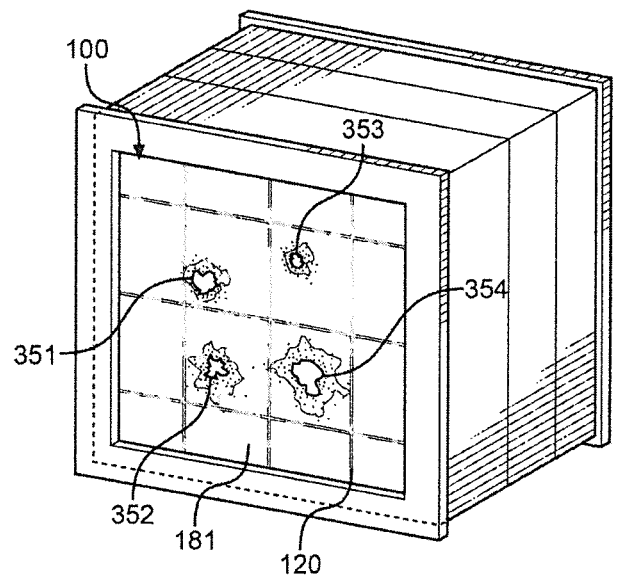
FIG. 3 is a front perspective view of a strike face of the armor add-on panel of FIG. 1 depicting four strike spots generally arranged in a square pattern.
Figure 4:
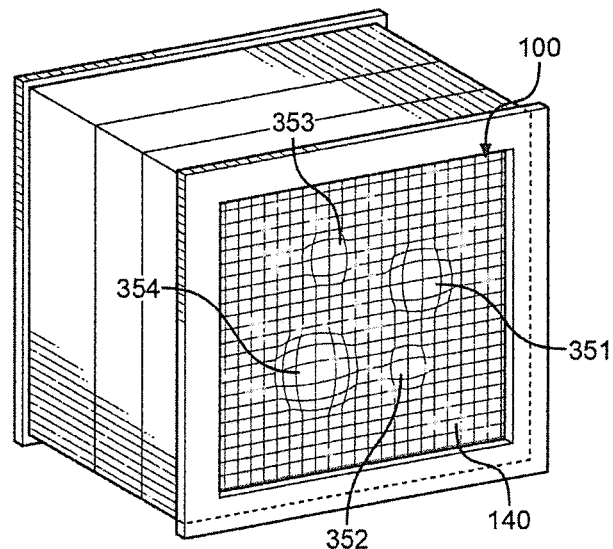
FIG. 4 is a rear perspective view of the armor spall liner of FIG. 1.

As illustrated in FIGS. 3 and 4, armor system 100 was tested and passed the STANAG level IV threat requirement (14.5 mm B32 API at a velocity comparable to a 200 meter range or 911 m/s (2990 fps)) and the aggressive AEP-55 multi-hit performance standard. Armor system 100 took four (4) shots 351, 352, 353, 354 in a square pattern with each side of the square being less than 100 mm (well within the AEP-55 shot pattern). These reference designs are represented in the table of FIGS. 23A-23D, as panels 24, 28, 31 and 33.

In connection with these designs, it should be noted that variations in these designs also worked. Parameters and ranges that were varied include the following: ceramic thickness (10-16 mm or ~0.39-0.63"); support plate thickness (~6.35-16.76 mm or 0.25-0.66"); and fiber ply count (2-48).

To achieve multi-hit capability in these designs, it is important to minimize hull plate deformation on successive hits to maintain support for add-on armor panel 120. Support plate 170 and composite backing system of the invention performed well with regard to multi-hit as an integrated armor system 100 over vehicle hull 130. The equivalent mass of polymer support plate 170 outperformed aluminum in multi-hit. Support plate 170 also outperformed polycarbonate (which didn't allow penetrator to be destroyed), polyethylene (e.g., Dyneema) and polypropylene (e.g., Tegris).

In all panels, the damage was confined to a single impact ceramic tile 162. Fiber-only support worked well for aluminum oxide ($Al_2O_3$)-based tiles while polymer support worked well for SiC-based tiles. This result is considered to be related to adhesion—better adhesion with fiber only, poorer adhesion with polymer support. At this point, it should be noted that there are other elements that could be incorporated into armor system 100, such as ceramic face plates; confined tiles; various ceramic geometry, thickness and type fiber weaves (e.g., basket, Jeno, plain); and fiber types (e.g., Vectran, polyethylene, polypropylene). Also, air gaps and filler materials (e.g., foam, honeycomb, polystyrene) can be used between the armor and hull. However, in armor system 100, armor panel 120 is preferably in intimate contact with hull 130.

In connection with additional tests run as represented in FIGS. 5A, 5B, 6A, 6B, 7A and 7B, the armor panels can be characterized as including:
a 11.4 psf panel 360 weight with a four shot pattern 362 according to Stanag 4652 with:
10.26 psf ceramic weight; and
1.14 psf all caged fiber backing system;
a 10.3 psf panel 370 with a four shot pattern 372 (partial success—complete penetration occurred with a disallowed hit but no second test panel was tested) with:
8.3 psf ceramic weight;
1.4 psf polymer support plate; and
0.6 psf caged fiber backing system;
A 11.2 psf panel 380 weight with a four shot pattern 382 into adjacent tiles with:
9.24 psf ceramic weight;
1.4 psf polymer support plate; and
0.56 psf caged fiber backing system As discussed above, the multi-hit attribute is a unique quality of this invention where the hull plate deformation is minimized on successive hits to maintain support to armor add-on panel 120 and confine damage to a single impact ceramic tile 162. This is due to the unique ability of armor support plate 170 to absorb energy from multiple ballistic events. This provides particular merit when armor panel 120 is used as an integrated armor system 100, where panel 120 is designed to be integrated directly over hull 130 with no gap between the two bodies. In building on the above, one principal finding showed that a dynamic β-transition range exists at strain rates exceeding $1,000\ s^{-1}$ for aliphatic support plate 170 at ~25° C. This dynamic damping mechanism allows this material to absorb energy in a unique manner during ballistic events.

At this point, it is considered appropriate to reflect upon how support plate 170 of the invention is distinct from other armor plates, particularly metal/Al, ultra-high-molecular-weight polyethylene (UHMWPE), polypropylene (PP), polycarbonate (PC), poly(methyl methacrylate) (PMMA), epoxy/phenolic and other polyurethane (PU) back plates.

Aluminum

Similar panel constructions were ballistically tested using Al 6061 as the support plate. These constructions performed well on the first shot. However, the deformation of aluminum on the first shot caused separation of the armor panel from the hull, resulting in failures on successive shots.

UHMWPE

When UHMWPE was tested as a support plate, the need for deformation of the support plate to effectively absorb energy was too great. The deformation due to the first shot was greater than 3.5" (~88.9 mm). Therefore, this material was ineffective as an integrated armor solution, where the panel is designed to be integrated directly over the hull.

Polypropylene

Polypropylene was tested as a support plate in ballistic testing as well. This material failed due to adhesion issues with the ceramic strike face that caused failures on successive shots due to strike face and support plate separation. This was also observed with UHMWPE and polycarbonate.

Polycarbonate

In this case, the support plate easily separated from the strike face due to poor adhesion. Further, the support plate had multiple cracks that propagated across adjacent tiles providing inadequate support on successive hits. It was also noted that the penetrator was not completely destroyed; therefore, the ceramic was not supported well enough to destroy the penetrator effectively. It should be obvious that other "impact-resistant" polymers, such as PMMA, would behave in a similar manner.

Epoxy/Phenolic

These materials were not evaluated due to their inherent brittle nature. These materials would likely not have provided adequate support to adjacent tiles on successive hits.

In connection with providing the capability for multiple hits, it is important to note the failure mechanism associated with observed localized damage in the support plate 170, which allows plate 170 to support ceramic tiles 162 individually. To that end, during the ballistic event, each ceramic tile 162 impacted directly by the projectile was destroyed while adjacent tiles remained intact. Upon examination of the polymer support plate 170, it was observed that support plate 170 fractured in a unique manner to support tiles 162 individually and localize the damage on support plate 170 to the area directly behind impacted tile 162.

Figure 8:
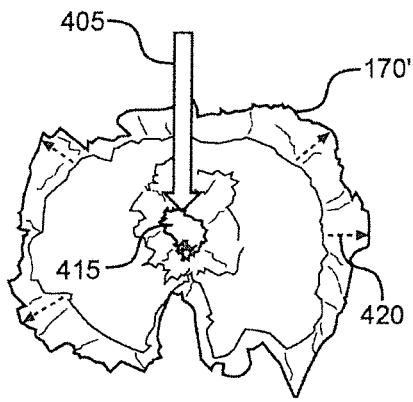
FIG. 8 is a top view of a polymer support plate taken from behind an impacted ceramic tile formed in accordance with the invention.
Figure 9:
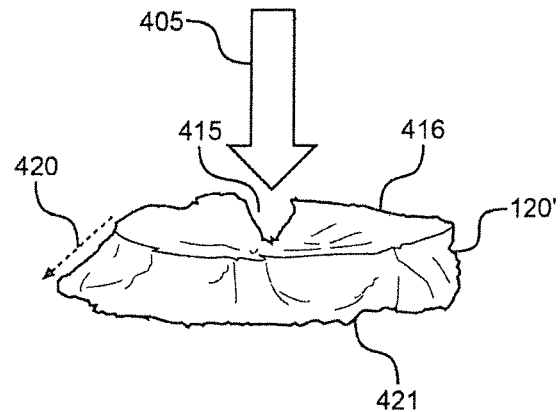
FIG. 9 is a side view of the polymer support place of FIG. 8.
Figure 10:
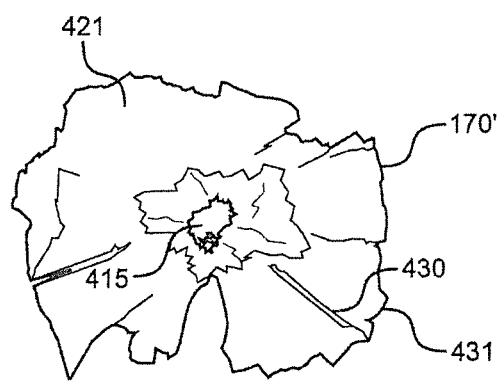
FIG. 10 illustrates radial cracks on the back surface of the polymer support plate of FIG. 8.

FIG. 8 shows a piece of a polymer support plate 170' that has been removed from a shot armor panel (not separately shown). Support plate 170' failed in a brittle fracture mode with very little deformation (<10 mm or ~0.39") in the direction of impact shot shown by arrow 405. It is not surprising this would occur, since the armor panel was subjected to a high-strain-rate impact. Upon closer examination of the top and side views in FIGS. 8 and 9, polymer support plate 170' has a conical fracture plane shown by arrow 410 with a locus, at point of impact 415, concaving upward. These fracture conoids initiated at a projectile-ceramic interface and propagated to a ceramic-support plate interface 416. At interface 416, these cones spread the load of the projectile onto a relatively wide area of support plate 170' as shown by arrows 420 with the surface area of plate 170' increasing from front interface 416 to back surface 421. This load spreading formed a network of radial cracks 430 that were initiated on back surface 421 of polymer support plate 170', as shown in FIG. 10. These radial cracks 430 were observed radiating outward from point of impact 415 to an outer perimeter 431 of polymer support plate 170'. It should be noted that spall cracks were not observed.

Figure 11:
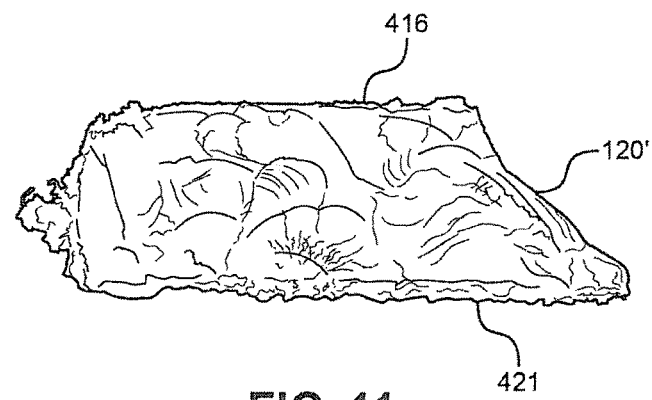
FIGS. 11 and 12 are side views illustrating radial fracture surfaces of the polymer support plate of FIG. 8.
Figure 12:
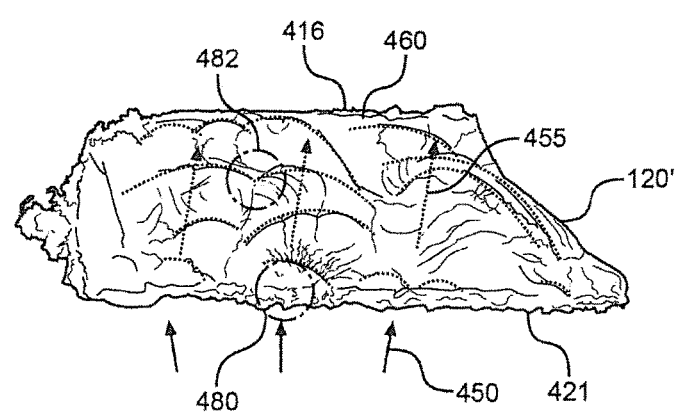
Figure 13A:
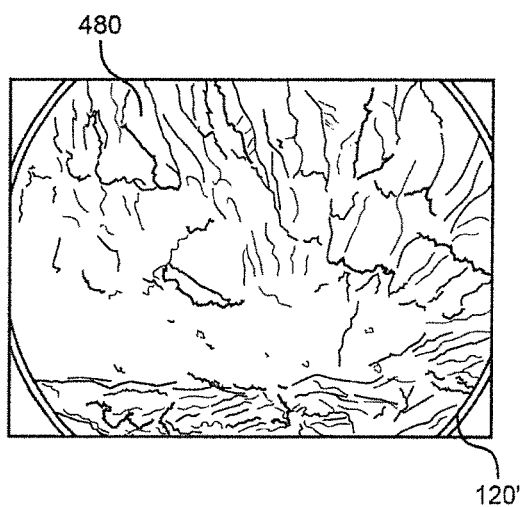
FIGS. 13A and 13B represent SEM micrographs of rib markings and radial fractures in a portion of the polymer support plate of FIG. 8.
Figure 13B:
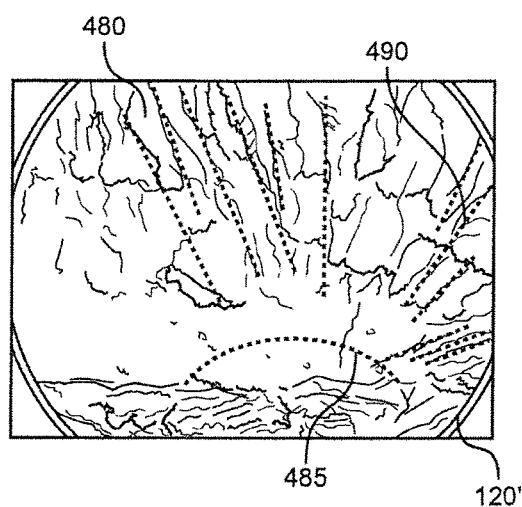
Figure 14:
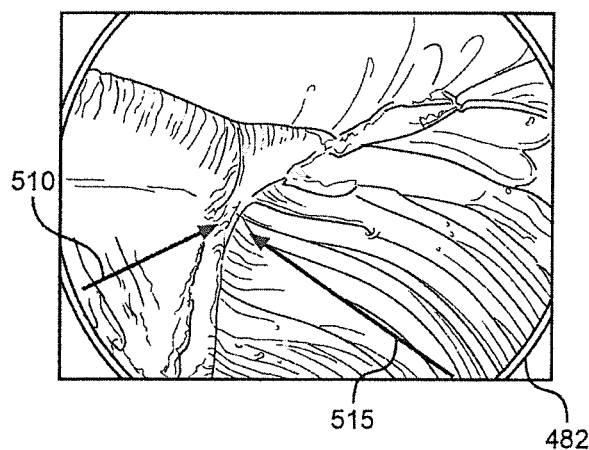
FIG. 14 represents a SEM micrograph of crack plane ledges in another portion of the polymer support plate of FIG. 8.

The origin and root cause of these radial cracks 430 were determined by examining the optical micrographs of FIGS. 11 and 12 and the scanning electron microscope (SEM) micrographs of FIGS. 13A, 13B and 14. FIGS. 11 and 12 show two identical side-view images of one of the radial fracture surfaces that were prepared from polymer support plate 170'. FIG. 12 shows markings for the fracture origins and crack propagation. In this case, the applied stress from the impact exceeded the strength of the material, and there was a complex interdependence of the loading rate, the magnitude and the nature of the stress (maximum principal tensile stress). Multiple, primary fracture origins for the radial fracture (indicated by arrows 450) were found along the back surface of plate 170' and propagated to the front surface (indicated by arrows 455). Secondary origins were initiated at other points on varying fracture planes. Both primary and secondary fracture origins were determined based on the observations of rib markings 460. Rib markings 460 are prominent markings that indicate the crack front. Markings 460 occur during crack arrest or sudden changes in crack velocity. Markings 460 are curved markings radiating from an origin that is located on the concave side with the direction of crack propagation radiating outward from the origin, as shown by arrows 455.

A radial fracture origin is more clearly shown in FIGS. 13A and 13B. These Figures represent an SEM micrograph of area 480 indicated in FIG. 12. Area 480 is a primary fracture origin. Both a rib marking 485 and several hackles 490 are present in this micrograph. Hackles 490 are indicative of violent activities due to specimen bending where the stresses change from compression to tension. The nature of this bending causes hackles 490 to radiate outward from the fracture origin. Various crack plane ledges were also observed at the intersection of two crack planes 510, 515, as shown in FIG. 14. FIG. 14 represents an SEM micrograph of area 482 from FIG. 12. Crack branching was also observed because the crack driving force exceeded the rate of energy dissipation.

Figure 15A:
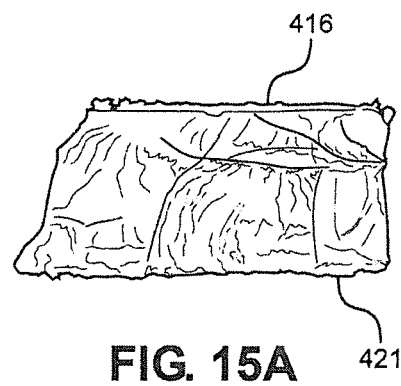
FIGS. 15A and 15B are identical side view images showing conical fractures in the surface of the polymer support plate of FIG. 8.
Figure 15B:
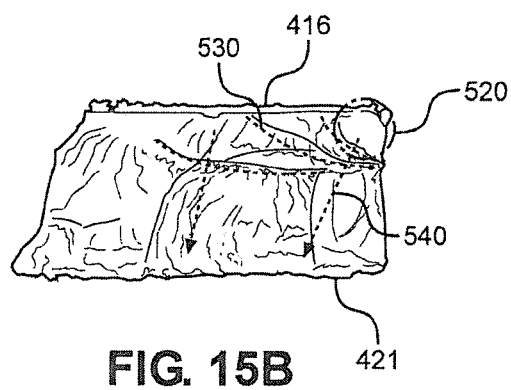
Figure 16A:
FIGS. 16A and 16B represent SEM micrographs of rib markings and radial fractures in a portion of the polymer support plate of FIG. 15 B.
Figure 16B:
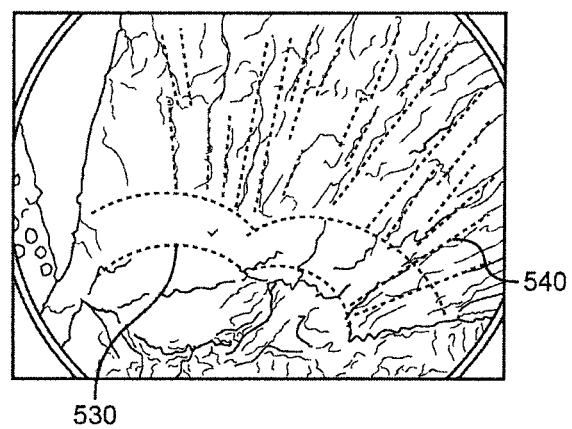

As discussed earlier, polymer support plate 170' has a conical fracture plane. An optical micrograph of this fracture surface is shown in FIGS. 15A and 15B. The fractures originated at the ceramic-support plate interface and propagated to the back surface of the polymer support plate. The fracture origin is more clearly shown in FIG. 16. This figure is an SEM micrograph of Zone 1 from FIG. 15A, which is a primary fracture origin. Both rib markings 530 and several hackles 540 are present in this micrograph. The presence of these conoidal cracks in support plate 170' are indicative of shear coupling between the ceramic and support plate 170' due to the urethane adhesive (i.e., shear-dominated, cone-crack formation). This shear coupling allows transmission of transverse motion and stress from the ceramic to support plate 170'. These attributes allow for this invention to be scalable with threat. In addition, support plate 170' can be used as a front spall shield.

The optical micrographs and SEM micrographs of polymer support plate 170' clearly show unique fracture morphology in the form of multiple fracture fronts and planes. This is indicative of polymer support plate's 170' ability to absorb energy from multiple events. These events are most likely caused by longitudinal and transverse stress wave generation and propagation along the thickness and radial direction of plate 170'. They are also caused by waves undergoing reflection and transmission at the interface due to impedance mismatching within armor panel 120. A further benefit of this support plate 170' is its ability to confine the ceramic and projectile debris in a finely pulverized form at the point of impact. This confinement enhances the erosion phase by extending the pulverized zone ahead of the penetrator, which improves ballistic performance.

One driving concern is the mechanism which allows the aliphatic support plate 170' to absorb energy in a unique manner during ballistic events. This also raises at least the question of whether there are other urethanes or impact-resistant polymers that behave in a similar manner. Certainly, armor panels 120 that were constructed as described earlier and contained aliphatic support plate 170 were successful in defeating the 14.5 mm B32 API threat against the AEP-55 multi-hit performance standard. Table 2 outlines particularly successful designs. However, similar constructions that used aromatic urethanes, polycarbonate, poly (methyl methacrylate) and other materials described earlier as support plate materials failed.

TABLE 2

| Part Number | Panel Number | Estimated Areal Density lbs sqft | Shot location (x, y) | PP CP | Velocity (fps) | Ceramic Type and Size | Kit wrap Leno Ply sqft | Ceramic Thickness mm | Ceramic Weight lbs sqft | Support Material Type |
|---|---|---|---|---|---|---|---|---|---|---|
| PR0315-49 | 24 | 12.59 | (3, 3) | PP | 2953 | SiC - 3" SG | 4 | 13 | 8.43 | 80 Shore D |
|  |  |  | (2, 3) | PP | 2982 |  |  |  |  |  |
|  |  |  | (3, 2) | PP | 2961 |  |  |  |  |  |
|  |  |  | (2, 2) | PP | 2959 |  |  |  |  |  |
| PR0315-53 | 28 | 12.74 | (3, 3) | PP | 2958 | Al2O3 - 3" square bonded | 4 | 13 | 10.37 | 80 Shore D |
|  |  |  | (2, 3) | PP | 2973 |  |  |  |  |  |
|  |  |  | (2, 2) | PP | EER1 |  |  |  |  |  |
|  |  |  | (3, 2) | PP | 2974 |  |  |  |  |  |

TABLE 2-continued

| | | | | | | | | | | |
|---|---|---|---|---|---|---|---|---|---|---|
| PR0315-58 | 33 | 12.50 | (3, 2) | PP | 2980 | SiC - 3" square | 4 | 16 | 10.38 | 65 Shore D |
| | | | (2, 2) | PP | 2969 | | | | | |
| | | | (3, 3) | PP | 2961 | | | | | |
| | | | (2, 3) | PP | 2989 | | | | | |
| PR0315-66 | PR0315-53 | 11.2 | (3, 2) | PP | 2985 | SiC—N 13.6 mm × 3" | 4 | 13.6 | 9.28 | 80 Shore D |
| | Offset | | (2, 2) | PP | 3007 | square BAE | | | | |
| | Test | | (2, 3) | PP | 2970 | | | | | |
| | | | (3, 3) | PP | 2993 | | | | | |
| PR0315-68 | PR0315-53 | 11.2 | (2, 5) | PP | 2949 | SiC - 14 mm × 2" square | 4 | 14 | 9.24 | 80 Shore D |
| | Offset | | (4, 5) | PP | 2980 | Superior Graphite | | | | |
| | Test | | (4, 2) | PP | 2970 | | | | | |
| | | | (5, 3) | PP | 2969 | | | | | |

| Part Number | Rear Support Support inches | Support Weight lbs | Front Fiber Ply sqft | Rear Fiber Ply sqft | Over Wraps Leno Ply sqft | Total Plies All Fibers sqft | Fiber Weight lbs | Urethane Weight lbs | As Cast Weight lbs |
|---|---|---|---|---|---|---|---|---|---|
| PR0315-49 | 0.625 | 3.61 | | 1 | 8 | 13 | 0.60 | 0.96 | 13.60 |
| PR0315-53 | 0.250 | 1.44 | | 2 | 8 | 14 | 0.66 | 1.28 | 13.76 |
| PR0315-58 | 0.250 | 1.44 | 1 | 2 | 8 | 15 | 0.72 | 0.96 | 13.50 |
| PR0315-66 | 0.250 | 1.45 | | 2 | 8 | 14 | 0.58 | 0.83 | 12.14 |
| PR0315-68 | 0.250 | 1.39 | | 2 | 8 | 14 | 0.59 | 0.86 | 12.08 |

Since this support plate 170 is a viscoelastic material, dynamic mechanical analysis (DMA) was used to investigate the mechanism for energy absorption during high strain rate events. DMA is a thermal analysis technique used to measure changes in the linear viscoelastic response of a material as a function of temperature or frequency (time). Simply described, DMA applies an oscillating (sinusoidal) force to a material sample and analyzes the material's response to that force. From this analysis, one can determine the tendency to flow (viscosity) from the phase lag and the stiffness (modulus) from the sample recovery. This can also be described as the ability to lose energy as heat (damping) and the ability to recover from deformation (elasticity). The modulus measured is not the traditional, Young's modulus determined from stress-strain curves. The modulus measured using DMA is a complex modulus which consists of an elastic modulus (E') and a loss modulus (E"). These modulus components provide a much more comprehensive material characterization by comparing the material's ability to return energy to its ability to lose energy. The ratio of these effects (E"/E') is called the tan δ, where δ is the phase lag between the applied force and the material's response to that force. The peak of the tan δ plot is highly sensitive to transitions in the material, and this is the means by which most glass transition ($T_g$) values are reported in the literature.

DMA tests were conducted using a TA Instruments Q800 DMA system to measure the storage modulus (E'), the loss modulus (E") and the mechanical loss (damping or tan δ) over a temperature range of −150 to 150° C. changing at a rate of 3° C. per minute and at 1 Hz. The samples were approximately 10×10×5 mm (~0.39×0.39×0.20") and clamped as a single cantilever. All samples equilibrated for 5 minutes at −150° C. before ramping.

Figure 17:
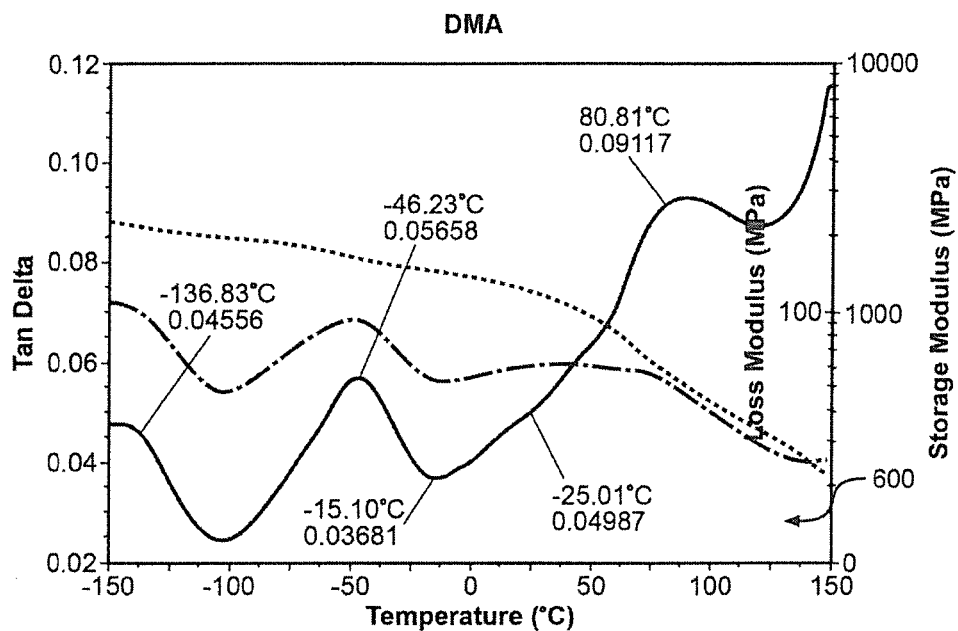
FIG. 17 is a DMA plot of aliphatic urethane at 1 Hz.
Figure 18:
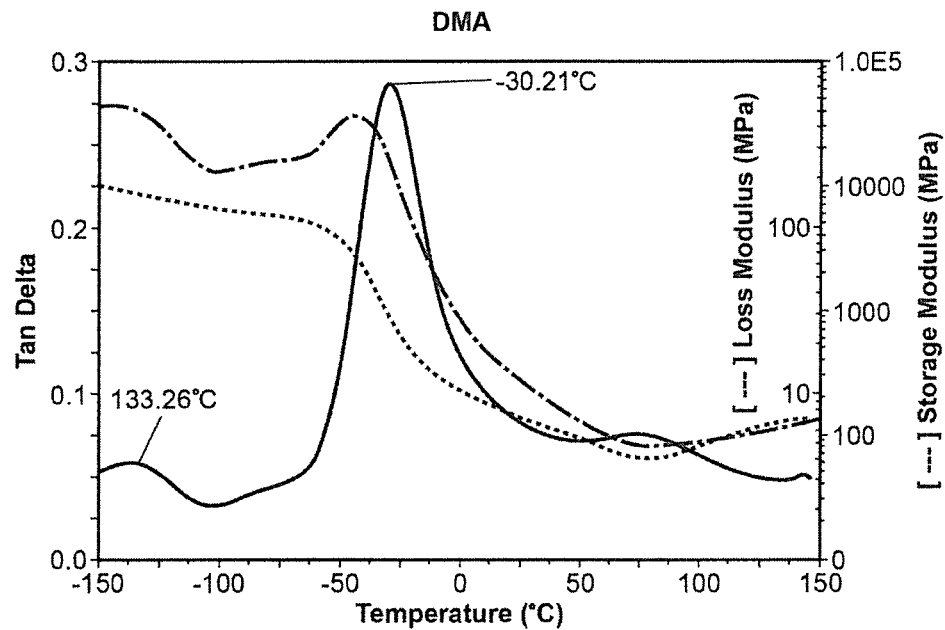
FIG. 18 is a DMA plot of aromatic urethane at 1 Hz.
Figure 19:
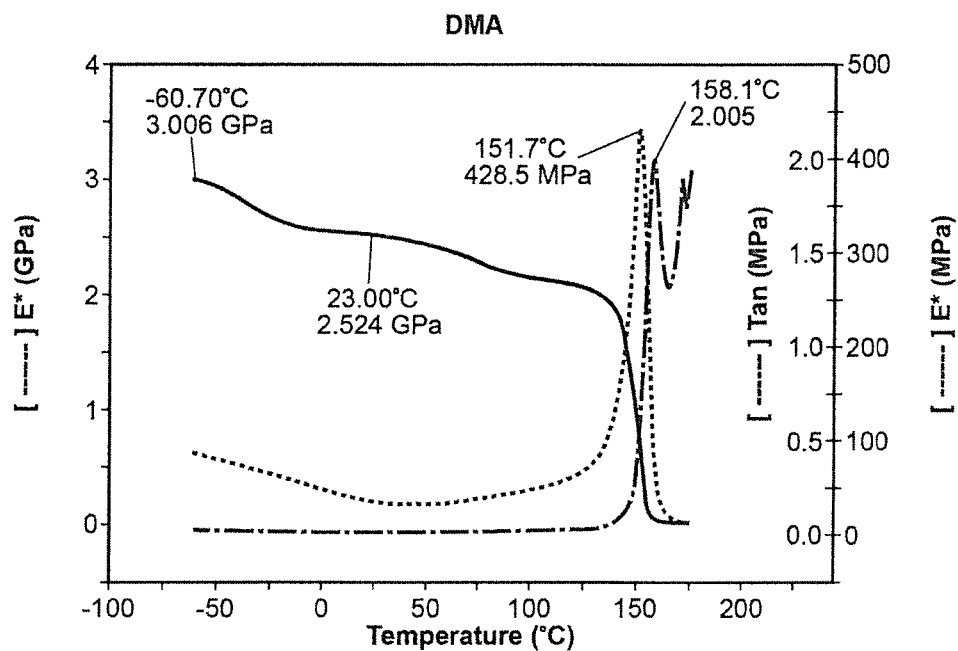
FIG. 19 is a DMA plot of polycarbonate.
Figure 20:
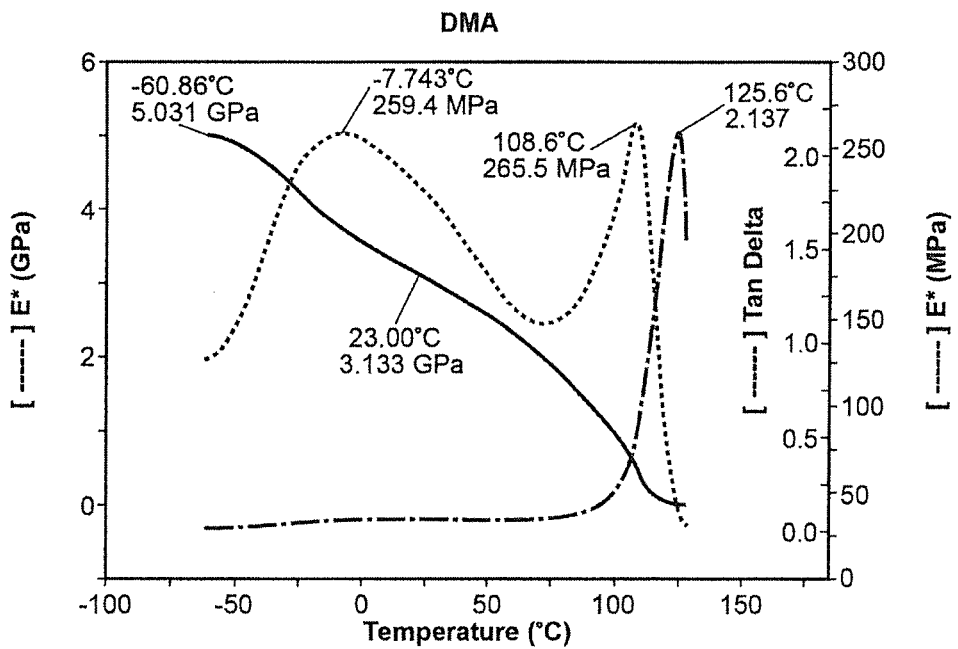
FIG. 20 is a DMA plot of poly(methyl methacrylate)

FIG. 17 shows a DMA plot 600 of storage modulus, loss modulus, and the damping factor, tan δ, as a function of temperature for the aliphatic support plate material. From the tan δ plot, it can be seen that the material goes through an α-transition peaking around 80.81° C., which is identified as a relatively small amplitude glass transition temperature. In this region, the storage modulus decreases over an order of magnitude, the loss modulus increases slightly then decreases considerably, and the tan δ goes through a maximum. It should be noted that even though the $T_g$ is assigned as the peak of the tan δ, it is actually over a range of temperatures. In addition, the β-transition is shown over a range of temperatures with a peak at −46.23° C. The β-transition is the next lowest transition beyond the first, or α-transition. The α-transition is a range of temperatures where there is sufficient energy for motions of a few atoms along the main chain or of side groups on the main chain of the polymer. The β-transition is a range of temperatures where there is sufficient energy for motions of groups of atoms smaller than those necessary to produce a glass transition. Conversely, FIG. 18 shows the dynamic mechanical properties of an aromatic urethane. In this case, there is a very strong α-transition peaking at −30.21° C. with no apparent or discernable β-transition. This data can also be compared to DMA plots of other "impact-resistant" polymers such as PC (shown in FIG. 19) and PMMA (shown in FIG. 20). From these plots, it can be seen there is no evidence of a significant β-transition in either PC or PMMA.

It was hypothesized that the β-transition is the key to the aliphatic material's ability to absorb energy during high strain rate events through dynamic damping. This was investigated using time-temperature superpositioning (tTS) to extrapolate the DMA data to higher frequencies (i.e., higher strain rates) to determine if there was a dynamic β-transition range for this material at ballistic strain rates.

The aliphatic support plate 170' is a viscoelastic material whose rheological behavior is a function of time and temperature. Further, it has been observed that there is a direct equivalency between time and temperature and their effect on rheological properties of these materials. For example, short times (high rates or high frequencies) can be thought of as events occurring at low temperatures, and long times (low rates or low frequencies) can be thought of as events occurring at high temperatures. Therefore, a master curve of the material property of interest can be created by shifting a series of curves at different temperatures to extrapolate the DMA data to higher strain rates at a specific end-use temperature. This technique is time-temperature superpositioning, which is an empirical method based on observations that viscoelastic data can be transposed (or shifted) along a time/frequency axis.

Figure 21:
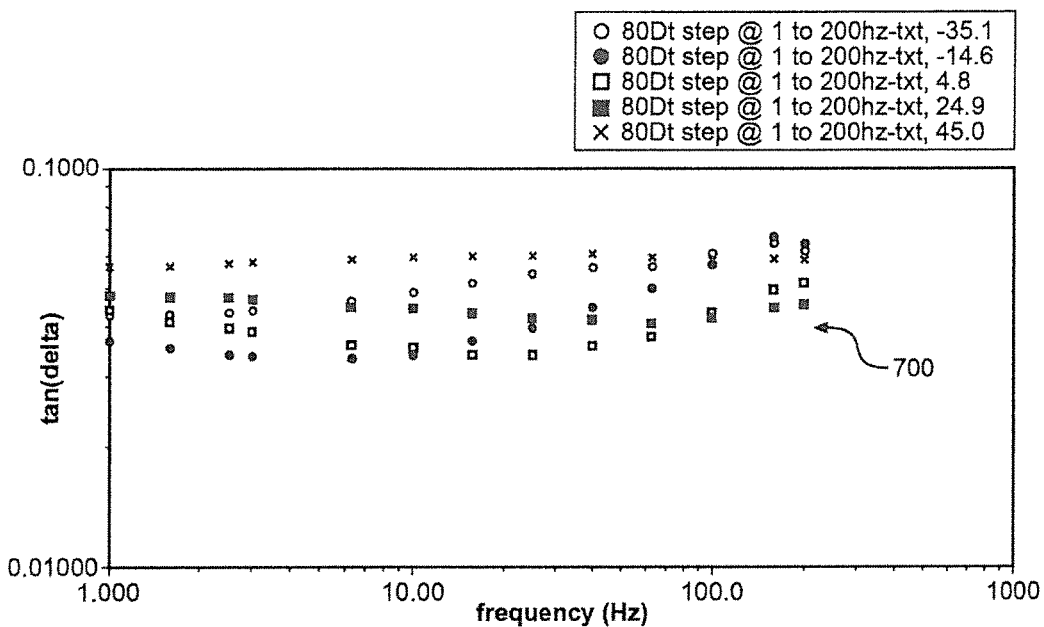
FIG. 21 is a time-temperature superposition plot of individual experimental runs of the aliphatic support plate material showing frequency versus tTS.

Data was collected using a TA Instruments DMA Q800 over a modest frequency range at a variety of temperatures to predict the aliphatic support plate material behavior over a wider frequency range than could be practically determined experimentally. Temperature steps were programmed from −35 to 45° C. in 20° C. increments. Frequency sweeps were performed at each temperature step from 1 to 200 Hz. FIG. 21 shows the tTS plot 700 of the individual experimental runs of the aliphatic support plate material.

Figure 22:
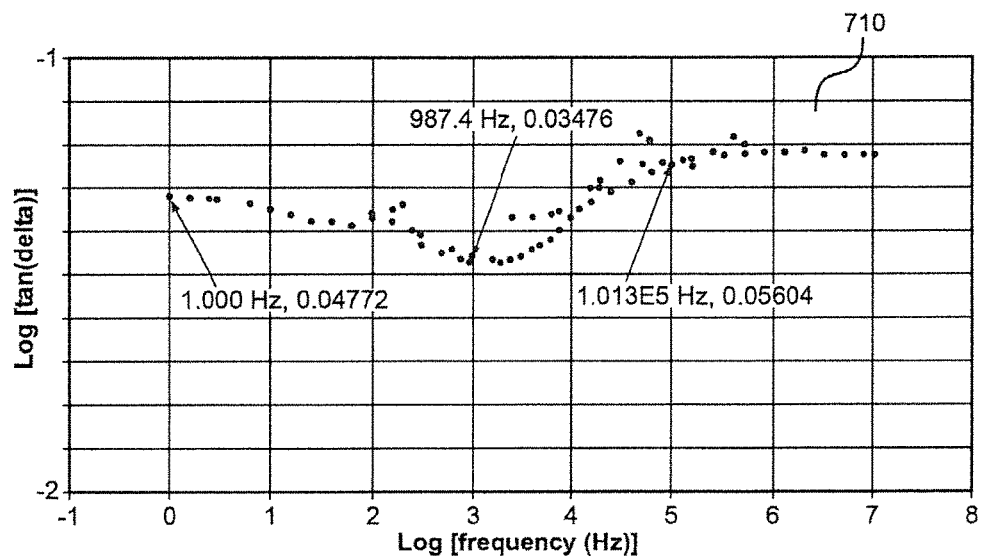
FIG. 22 is a master curve for the aliphatic support plate material.

FIG. 22 shows a master curve 710 generated by shifting the individual experimental data points along the frequency axis of the tTS plot to align them at a reference temperature of 24.9° C. From master curve 710, it can be seen that the tan δ value of the aliphatic material at 1 Hz is approximately the same value as that shown in FIG. 17 near 25° C., which is approximately 0.05. The tan δ then goes through a minimum of 0.035 around 1 kHz, which corresponds to the minimum observed of ~0.037 around ~15° C. in FIG. 17. Finally, the tan δ increases with frequency to its highest value (greater than 0.056) above 100 kHz and then plateaus. Coincidentally, this is entering the ballistic strain rate range above 1,000 $s^{-1}$ (100 kHz). Further, this tan δ value corresponds to the β-transition tan δ of ~0.057 at −46.23° C. as shown in FIG. 17. This principal finding shows that a dynamic β-transition range exists at strain rates exceeding 1,000 $s^{-1}$ for the aliphatic support plate at ~25 C. This dynamic damping mechanism allows this material to absorb energy in a unique manner during ballistic events. This finding is counter to data presented by van Ekeren and Carton who stated that for an elastomeric material to perform well as a backing material in armor, the material must be in its dynamic glass transition.

Based on the above, it should be readily apparent that the present invention provides an armor system that protects against impacts from multiple projectiles. Although described with reference to preferred embodiments, it should be readily understood that various changes or modifications could be made to the invention without departing from the spirit thereof. In general, the invention is only intended to be limited by the scope of the following claims.

The invention claimed is:

1. A method of forming an armor panel with multi-hit capacity having a predetermined length and width comprising:
   cutting a first layer of fiber weave to approximately two times the predetermined length and placing the first layer into a mold;
   cutting a layer of high strength fiber weave to the predetermined length and placing the layer of high strength fiber weave in the mold;
   placing a support plate including edges in the mold;
   placing a center layer of ballistic tiles in the mold;
   wrapping the first layer around the layer of high strength fiber, the support plate and the center layer of ballistic tiles; and
   closing and heating the mold to cure the armor panel.

2. The method according to claim 1, further comprising:
   forming the center layer of ballistic tiles by cutting a second layer of high strength fiber weave to approximately two times the predetermined length and wrapping ballistic tiles with the second layer of high strength fiber weave.

3. The method according to claim 1, wherein placing the first layer of fiber weave in the mold includes laying two plies of high strength fiber in the mold and orienting the plies at 90 degrees with respect to each other and adding urethane to the mold.

4. The method according to claim 3, further comprising abrading the support plate.

\* \* \* \* \*